United States Patent
Hargarten et al.

(10) Patent No.: US 7,106,547 B1
(45) Date of Patent: Sep. 12, 2006

(54) METHOD AND APPARATUS FOR DETERMINING EMBEDDED RUNOUT CORRECTION VALUES USING FEEDBACK

(75) Inventors: James Hargarten, Lafayette, CO (US); Thomas Melrose, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 111 days.

(21) Appl. No.: 10/318,316

(22) Filed: Dec. 11, 2002

Related U.S. Application Data (60) Provisional application No. 60/339,463, filed on Dec. 11, 2001.

(51) Int. Cl.
*G11B 5/596* (2006.01)
(52) U.S. Cl. .................................. 360/77.04
(58) Field of Classification Search .............. 360/77.04
See application file for complete search history.

(56) References Cited

U.S. PATENT DOCUMENTS

| | | | |
|---|---|---|---|
| 4,412,165 A | 10/1983 | Case et al. ................. 318/636 |
| 6,115,203 A | 9/2000 | Ho et al. ................. 360/77.04 |
| 6,493,173 B1 * | 12/2002 | Kim et al. ............... 360/77.04 |
| 6,545,835 B1 * | 4/2003 | Codilian et al. ......... 360/77.04 |
| 6,549,362 B1 * | 4/2003 | Melrose et al. .......... 360/77.04 |
| 6,657,810 B1 * | 12/2003 | Kupferman .............. 360/77.04 |
| 6,804,079 B1 * | 10/2004 | Hsin ........................ 360/77.04 |

OTHER PUBLICATIONS

Hargarten, et al., U.S. Appl. No. 10/029,528, filed Dec. 20, 2001, "Method and Apparatus for Automatically Determining an Embedded Runout Correction Threshold".

* cited by examiner

*Primary Examiner*—Kim Wong
(74) *Attorney, Agent, or Firm*—Tejpal S. Hansra (57) ABSTRACT

A method and apparatus for determining embedded runout correction values uses a closed-loop system (with feedback) in a disk drive. Optionally, the embedded runout correction values may be determined after the disk drive has been manufactured and placed in the field. In addition, the embedded runout correction values may be updated after the disk drive has been manufactured and placed in the field.

60 Claims, 5 Drawing Sheets

METHOD AND APPARATUS FOR DETERMINING EMBEDDED RUNOUT CORRECTION VALUES USING FEEDBACK

CROSS-REFERENCE TO RELATED APPLICATIONS

This application claims priority from U.S. Provisional Patent Application Ser. No. 60/339,463 filed Dec. 11, 2001, which is incorporated herein by reference in its entirety.

FIELD OF THE INVENTION

The present invention relates to transducer positioning in a magnetic data storage system, such as a computer disk drive. More particularly, the present invention relates to a method and apparatus for compensating for repeatable runout (RRO) in a magnetic data storage system.

BACKGROUND OF THE INVENTION

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo system is generally implemented. The servo system uses servo data read from the disk surface to align the transducer with the desired track. The servo data is generally written to the disk using a servo track writer (STW). However, there has been a movement towards having the disk drive self-servo write some portion or, in some cases, all of the servo data.

In an ideal disk drive, the tracks of the disk are non-perturbed circles situated about the center of the disk. As such, each of these ideal tracks includes a track centerline that is located at a known constant radius from the disk center. In an actual system, however, it is difficult to write non-perturbed circular tracks to the disk. That is, due to certain problems (e.g., vibration, bearing defects, inaccuracies in the STW and disk clamp slippage), tracks are generally written differently from the ideal non-perturbed circular track shape. Positioning errors created by the perturbed nature of these tracks are known as written-in repeatable runout (WRRO).

The perturbed shape of these tracks complicates the transducer positioning function during read and write operations because the servo system needs to continuously reposition the transducer during track following to keep up with the constantly changing radius of the track centerline with respect to the center of the spinning disk. Furthermore, the perturbed shape of these tracks can result in problems such as track squeeze and track misregistration errors during read and write operations.

In order to reduce such problems, disk drive manufacturers have developed techniques to measure the WRRO so that compensation values (also known as embedded runout correction values or ERC values) may be generated and used to position the transducer along an ideal track centerline. Examples of such techniques may be found in U.S. Pat. No. 4,412,165 to Case et al. entitled "Sampled Servo Position Control System," U.S. Pat. No. 6,115,203 to Ho et al. entitled "Efficient Drive-Level Estimation of Written-In Servo Position Error," and U.S. Pat. No. 6,549,362 to Melrose et al. entitled "Method and Apparatus for the Enhancement of Embedded Runout Correction in a Disk Drive," all of which are incorporated herein by reference.

In general, correcting poorly-written tracks takes place in a self-test procedure at the factory (i.e., during the manufacturing process); that is, before the disk drive is delivered to an end user. Each disk drive is required to complete its self-test procedure within a predetermined period of time. If a disk drive does not complete its self-test procedure within the predetermined period of time, it fails the self-test procedure and is discarded.

As is understood by those skilled in the art, the process of determining ERC values during the manufacturing process is somewhat time consuming. While it would be beneficial to develop ERC values for each and every sector of each and every track of a disk drive during the manufacturing process, this is rarely done because the disk drive would likely fail its self-test procedure. Furthermore, manufacturing times would become excessive if ERC values were developed in such a manner.

Accordingly, disk drive manufacturers have developed techniques that are used in the manufacturing process, which attempt to correct only the most poorly-written tracks of a disk drive, instead of all of the tracks of each disk drive. In such techniques, an ERC threshold is used in determining which tracks are to be corrected.

More specifically, in one technique, a position error signal (PES) due to repeatable runout (PES RRO) is measured by track following and averaging the position error from the servo bursts in each servo sector associated with the track for multiple revolutions (e.g., 25 revolutions) of the disk. As will be understood by those skilled in the art, the position error is averaged for multiple revolutions of the disk in an attempt to average-out the affects of non-repeatable runout (NRRO).

If the absolute value of the average PES RRO for any servo sector in the track exceeds the ERC threshold, the track is corrected. That is, ERC values are determined for all of the servo sectors of that track. However, if the absolute value of the average PES RRO for each of the servo sectors in the track is less than the ERC threshold, the track is not corrected.

U.S. patent application Ser. No. 10/029,528 filed Dec. 20, 2001 describes a method and apparatus for automatically determining ERC thresholds on a drive-by-drive basis in order to make efficient use of the self-test time available to correct tracks. Such application is incorporated herein by reference in its entirety.

Since attempts are made to correct only the most poorly written tracks in a disk drive, many other poorly written tracks may still be included in a disk drive when it reaches an end user. Furthermore, a disk drive's parameters (e.g., flying height, head linearity, magnetic image, burst sizes, etc.) may change, which may require adjustment of the ERC values after a disk drive has left the factory and is in the possession of an end user. Accordingly, it would be desirable to correct the tracks after the disk drive has left the factory and been provided to an end user.

Figure 1:
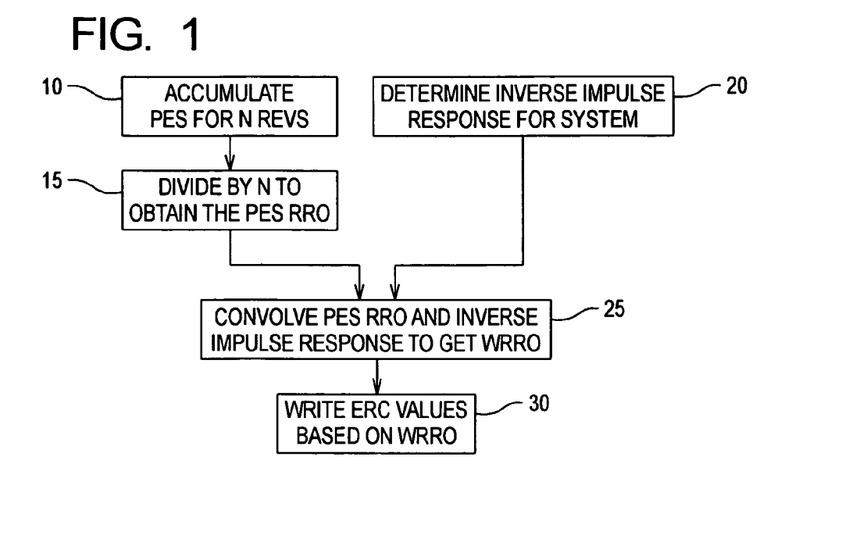
FIG. 1 is a flowchart illustrating an exemplary open-loop system for determining ERC values.

Prior techniques for correcting poorly-written tracks by generating ERC values have been open-loop techniques. One example of a prior open-loop technique is illustrated in FIG. 1, where the ERC values are determined using a batch process. That is, a PES associated with each servo sector of a track is collected over many revolutions of the disk and then averaged to obtain the PES RRO. The PES RRO is then circularly convolved with the inverse impulse response of the system to obtain the WRRO. The ERC values for the track are based on the WRRO. Importantly, the ERC values are generated once.

With reference to FIG. 1, in step 10, when following a track, the PES is measured and summed for each of the servo bursts associated with the track for N revolutions of the disk. Next, in step 15, the PES RRO is determined by dividing the sums by N to obtain the average PES associated with each of the servo bursts. As will be understood by those skilled in the art, the position error is averaged for N revolutions of the disk in an attempt to average-out the affects of NRRO. However, this is performed in an open-loop manner.

In step 20, the inverse impulse response for the disk drive is obtained. As will be understood by those skilled in the art, the inverse impulse response may be obtained in a variety of ways, including those described in U.S. Pat. Nos. 6,115,203 and 6,549,362. Furthermore, the inverse impulse response may be obtained for each transducer in a disk drive as described in U.S. Pat. No. 6,549,362.

Next, in step 25, the average PES RRO is circularly convolved with the inverse impulse response to obtain the WRRO. Finally, in step 30, the ERC values are determined and written to the disk surface based upon the WRRO.

While the technique of FIG. 1 has its advantages, it, along with other open-loop techniques, has its drawbacks. Specifically, the open-loop system cannot properly compensate for certain errors. For example, the open-loop system of FIG. 1 cannot properly compensate for PES non-linearities (e.g., due to read asymmetry and other non-linear error sources), errors in modeling the inverse impulse response (e.g., gain error), and errors introduced into the system by NRRO (e.g., noise when writing the ERC values).

Accordingly, it would be desirable to provide a method and apparatus for determining ERC values that overcomes the deficiencies of open-loop systems.

SUMMARY OF THE INVENTION

The present invention is designed to meet the aforementioned, and other, needs. The invention is directed to method and apparatus for determining ERC values using a closed-loop system (i.e., with feedback).

In one embodiment, the present invention provides a disk surface having a track written thereon. ERC values are determined for the track using feedback.

In another embodiment, the ERC values are determined after the disk drive has completed its in-factory manufacturing and been placed in the field.

In another embodiment, the ERC values are updated after the disk drive has completed its in-factory manufacturing and been placed in the field.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 3:
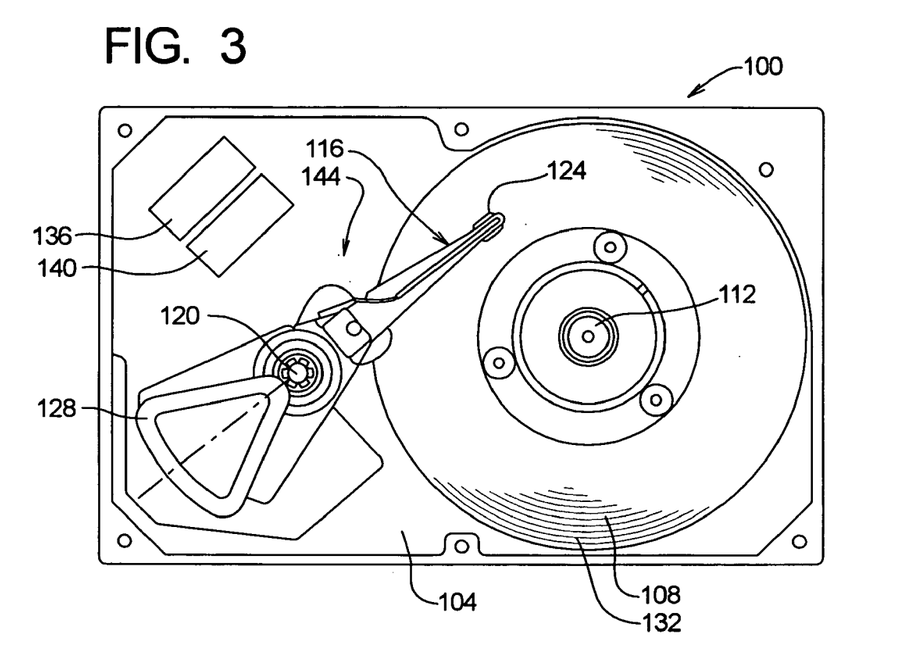
FIG. 3 is a diagrammatic representation illustrating a conventional disk drive, with its top cover removed, in which the present invention may be implemented.

FIG. 3 illustrates a typical computer disk drive. The disk drive 100 includes a base 104 and a magnetic disk (or disks) 108 (only one of which is shown in FIG. 3). The disk 108 is interconnected to the base 104 by a spindle motor (not shown) mounted within or beneath the hub 112 such that the disk 108 can be rotated relative to the base 104. Actuator arm assembly (or assemblies) 116 (only one of which is shown in FIG. 3) is interconnected to the base 104 by a bearing 120. The actuator arm assembly 116 includes a transducer 124 (which includes both a read element and a write element) at a first end to transfer data to and from a surface of the disk 108. A voice coil motor 128 pivots the actuator arm assembly 116 about the bearing 120 to radially position the transducer 124 with respect to the disk 108. By changing the radial position of the transducer 124 with respect to the disk 108, the transducer 124 can access different tracks 132 on the disk 108. The voice coil motor 128 is operated by a controller 136 that is, in turn, operatively connected to a host computer (not shown). A channel 140 processes information read from the disk 108 by the transducer 124.

Figure 4:
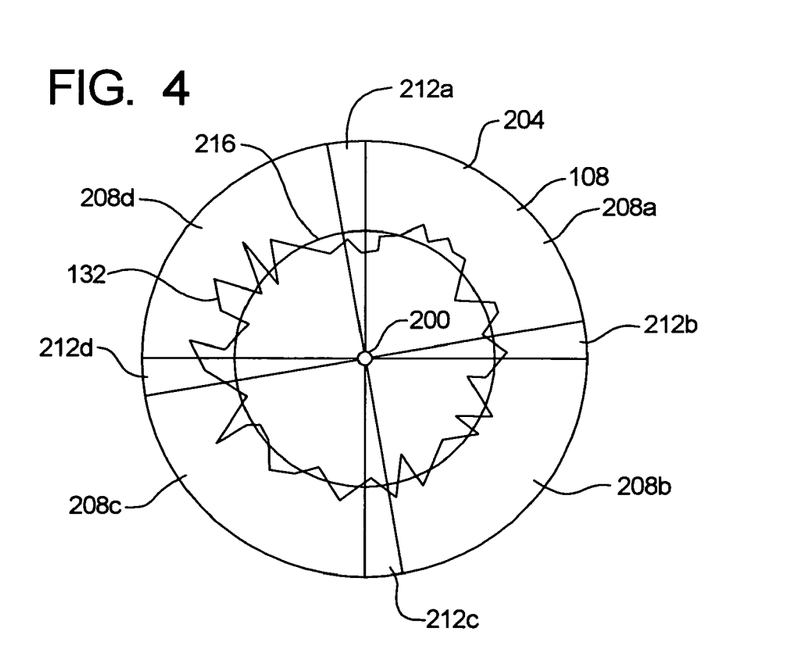
FIG. 4 is diagrammatic representation of a magnetic storage disk having a perturbed track.

As illustrated in FIG. 4, the disk 108 is substantially circular in shape and includes a center point 200. The disk 108 also includes tracks 132 (only one of which is illustrated in FIG. 4) on an upper surface 204 of the disk 108 for storing digital data. The tracks 132 are divided into data fields 208a–208d and servo sectors 212a–212d. Generally, the data fields 208a–208d are used for storing user data as a series of magnetic transitions, while the servo sectors 212a–212d are used for storing servo information, also as a series of magnetic transitions, that provide the transducer 124 with positioning information. In particular, the servo sectors 212a–212d provide the transducer 124 with information concerning its position over the disk 108. More particularly, the servo sectors 212a–212d provide information to the transducer 124 concerning the identity of the track 132 and the servo sector 212 over which the transducer 124 is flying, and concerning the position of the transducer 124 with respect to the centerline of the track 132.

Although the disk 108 illustrated in FIG. 4 has a relatively small number of data tracks 132 and servo sectors 212, it can be appreciated that a typical disk drive contains a very large number of data tracks 132 and servo sectors 212. For example, disk drives having over 90,000 tracks per inch and over 250 servo sectors per track are presently available.

The disk drive 100 includes a servo control system 144 for controlling the position of the transducer 124 with respect to the track 132 being followed. In general, the servo control system 144 comprises the transducer 124 being positioned, which reads position error information from the servo sectors 212, the actuator arm assembly 116 from which the transducer 124 is suspended, the voice coil motor 128, the controller 136 and the channel 140. As will be described in greater detail below, the response of the servo control system 144 to a given input is given by the impulse response of the servo control system 144.

Track 132 is ideally non-perturbed and ideally shares a common center 200 with the disk 108, such as the ideal track 216 illustrated in FIG. 4. Due to system imperfections, however, the actual written track 132 can be perturbed, such as non-ideal track 132 illustrated in FIG. 4, as compared to the ideal track 216.

A perturbed or non-ideal track 132 is difficult for the transducer 124 to follow because the position of the transducer 124 must constantly be adjusted by the servo control system 144. Consequently, the positioning of the transducer 124 is not as accurate on the written track 132 as it would be on the ideal track 216. As will be described in greater detail below, the present invention provides a method and apparatus for determining ERC values using feedback. By using ERC values determined using feedback (i.e., a closed-loop technique), the transducer 124 may more closely follow the path of an ideal track (such as track 216) using the servo information written in a non-ideal track (such as track 132), as compared to ERC values determined using open-loop techniques. Accordingly, the present invention may be used to approximate a disk drive having a disk with tracks that are almost perfectly-written.

As mentioned above, the tracks 132 on the disk 108 are each divided into data fields 208 and servo sectors 212. The servo sectors 212 include, among other things, information for use by the disk drive 100 in locating the transducer 124 above a desired track 132. When a host computer requests that data be read from or written to a particular data field 208 in a particular track 132, the transducer 124 must be moved to the track 132 and then must be positioned at a predetermined location relative to the centerline of the track 132 before a data transfer can take place. For purposes of illustrating the present invention, it will be assumed that the transducer 124 should be placed on the track centerline in order to read from and write to the disk 108. It should be understood that the invention is not limited to solely reading and writing when the transducer 124 is placed at the track centerline. As noted above, the present invention allows the transducer 124 to follow the ideal representation (ideal track 216) of a track 132 that is perturbed as written to the disk 108.

The disk drive 100 uses the information stored in the servo sectors 212 to first locate the desired track 132 and to then appropriately position the transducer 124 with respect to the centerline of the desired track 132. The data fields 208 include user data that can be accessed by a host computer. In general, the number of servo sectors 212 per track 132 on the disk 108 is a matter of design choice. The number may be dictated by, for example, a servo update rate.

Figure 5:
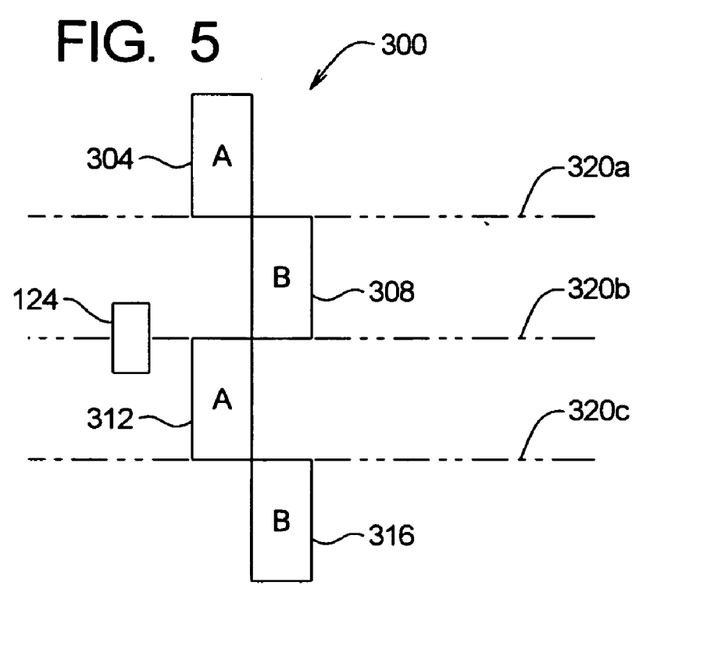
FIG. 5 is a diagrammatic representation of a servo burst pattern that may be used to position a transducer with respect to a track centerline.

FIG. 5 illustrates a typical servo pattern 300 stored within a servo sector 212 for centering the transducer head 124 on a desired track 132. The servo pattern 300 includes servo bursts 304, 308, 312 and 316 that define the centerlines 320a–320c of the tracks 132. The servo bursts 304, 308, 312 and 316 are divided into A bursts 304, 312 and B bursts 308, 316 that are each approximately a track-width wide and that alternate across the disk surface 204. The boundary between an A burst and an adjacent B burst (e.g., A burst 312 and B burst 308) defines the centerline (e.g., centerline 320b) of the track 132.

To center the transducer 124 using the A and B bursts, the transducer 124 is first moved to the desired track 132 during a seek operation and, once there, reads the A and B bursts on the desired track 132. The signal magnitudes resulting from reading the A and B bursts are then combined (such as by subtracting the B burst magnitude from the A burst magnitude) to achieve the PES. The PES indicates the distance between the center of the transducer head 124 and the centerline (e.g., centerline 320b) of the desired track 132. The PES is used by the disk drive 100 to change the position of the transducer 124 to one that is closer to the desired (centered) position. This centering process is repeated for each successive servo sector 212 on the track 132 until the requested read/write operation has been performed in the appropriate data field 208. It should be appreciated that the present invention may be used with other schemes for storing servo information on a disk, such as schemes having four or more servo bursts, or, schemes that use zones, constant linear density (CLD) recording, split data fields, and/or hybrid servo.

Traditionally, the A bursts 304, 312 and the B bursts 308, 316 as well as all other servo information have been written to the disk surface 204 using a STW after the disk 108 is assembled into the disk drive 100 during the manufacturing processes. However, a variety of methods have now been developed which do not only use the STW for writing servo information onto the disk surface 204. For example, techniques have been developed which allow a portion of the servo information to be written through use of a STW and another portion of the servo information to be self-written by the transducers 124. Furthermore, in another technique, the transducers 124 may self-write the entirety of the servo information. In a further technique, printed media may be used by the transducers 124 to self-write some or all of the servo information. It should be understood that the present invention may be used regardless of the manner by which servo information is written onto the disk surface 204. For example, WRRO may occur even though only some (or in some cases none) of the WRRO is due to a STW. That is, the servo information does not necessarily have to be written using a STW.

The A and B bursts define the locations of the tracks 132 on the disk 108. That is, on a non-ideal track (such as track 132), the A and B bursts are written such that the centerline of the track 132 does not describe a perfect circle, but rather is perturbed. However, the transducer 124 can follow the path of an ideal track 216 by an adding an appropriate ERC or offset value in the servo sectors 212 of a particular track 132. As illustrated in FIG. 4, the offset amount between the centerline of the non-ideal track 132 and the path of the ideal track 216 is different in each servo sector 212a–212d of the track 132. By determining the WRRO values for the servo sectors 212 in a track 132, the ERC values may be determined to modify the PES so that the transducer 124 can follow (or closely approximate) the path of the ideal track 216. The ERC values may then be stored, for example, in the servo sectors 212, in look-up tables maintained in the disk drive 100 or in any other suitable storage location, such as memory included in or accessible to the disk drive 100.

If the transducer 124 is to follow a perturbed path, such as that of a non-ideal track 132, the position of the transducer 124 must constantly be adjusted as the disk 108 rotates. Therefore, when performing conventional track following on a non-ideal track 132, adjustments are constantly made to position the transducer 124 to keep it centered on the track 132. The transducer 124 position is adjusted, as described above, by deriving a PES from the servo bursts, such the A burst 312 and the B burst 308 where the centerline 320b is followed. The PES creates a control signal for the voice coil motor 128 (or other movement means) to move the transducer 124 an appropriate amount. Because the transducer 124 position is continuously being adjusted, perfect or near perfect registration between the transducer 124 and the centerline of the track 132 (e.g., centerline 320b) is rarely achieved. This can create problems such as high track misregistration values.

Figure 6:
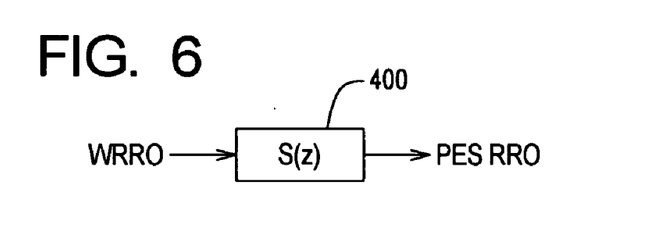
FIG. 6 is a block diagram that depicts the relationship between WRRO and a PES for a particular track.

As illustrated in FIG. 6, the PES RRO values that are derived from the servo sectors 212 associated with a track 132 during track following are related to the WRRO values for the track 132 by a predetermined transfer function S(z) 400. The transfer function 400, in general, describes how the servo control system 144 reacts to and follows the perturbed track 132. That is, WRRO is the stimulus and PES RRO is the response.

Figure 7:
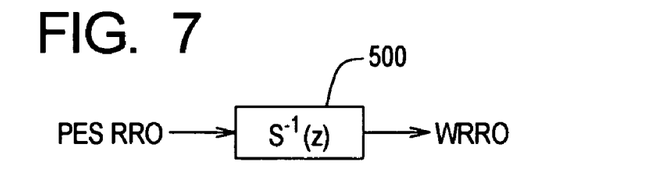
FIG. 7 is a block diagram that depicts the relationship between the PES and WRRO for a particular track.

As illustrated in FIG. 7, in order to determine the WRRO values using the measured PES RRO values, the inverse transfer function $S^{-1}(z)$ is determined and the PES RRO values are applied thereto (e.g., by circular convolution).

Figure 2:
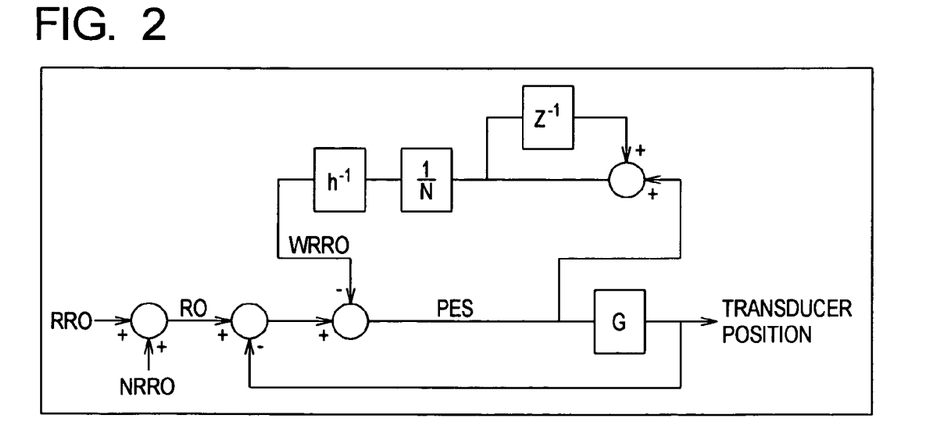
FIG. 2 is a block diagram illustrating an exemplary open-loop system (similar to FIG. 1) for determining ERC values.

As mentioned above, prior techniques for determining the ERC values are open-loop systems. In one such system (described in connection with FIGS. 1 and 2), the PES RRO is determined by summing the position error values associated with each servo sector 212 in a track 132 for many revolutions of the disk 108 while track following, and then dividing the summed values by the number of revolutions of the disk 108 used to collect the position error data. After a convolution process, the ERC values are updated.

In contrast, in a preferred embodiment of the present invention, the ERC values are updated continuously (rather than in a batch process). Importantly, when determining the ERC value for a given servo sector 212, the present invention utilizes the position error (which includes both PES RRO and NRRO) introduced during the previous revolution of the disk 108. Accordingly, the ERC values are determined using feedback.

Figure 8:
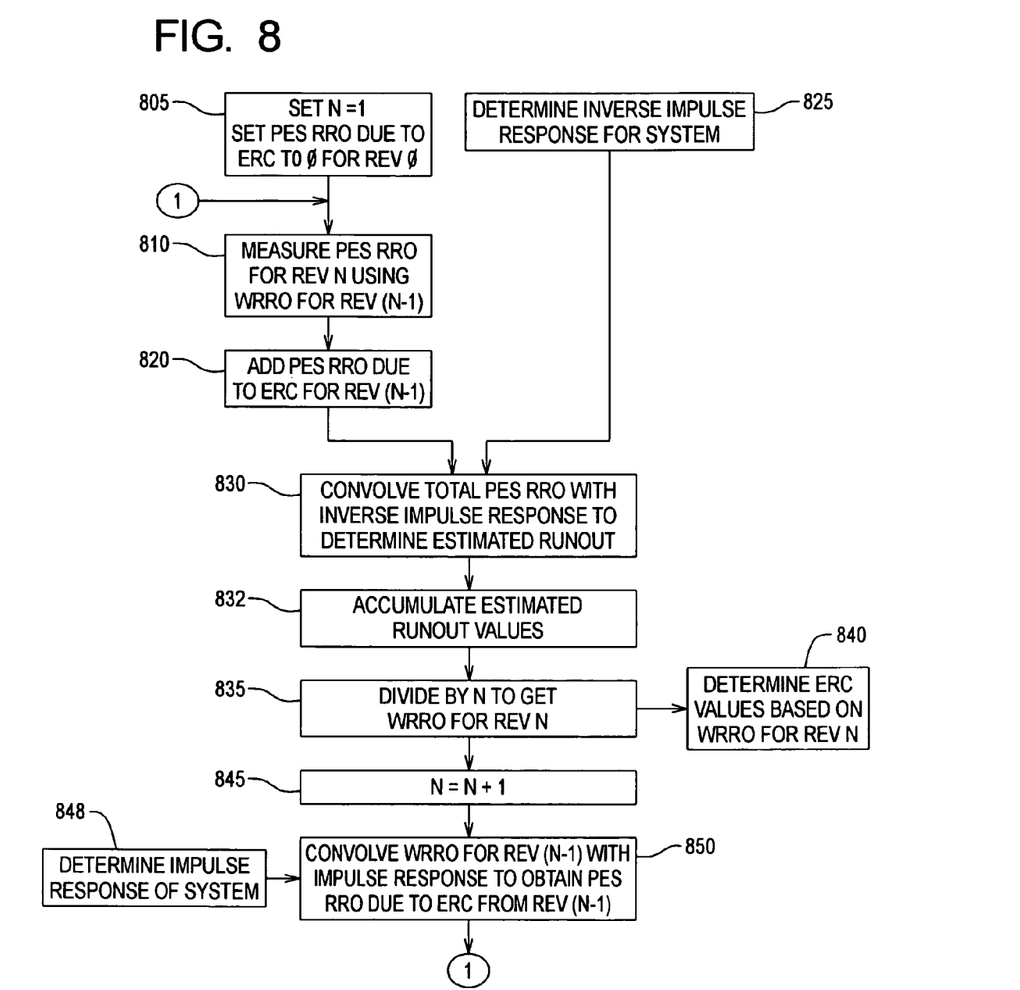
FIG. 8 is a flowchart illustrating a method for determining ERC values using feedback in accordance with an embodiment of the present invention; and, FIG. 9 is a block diagram illustrating a method for determining ERC values using feedback (similar to FIG. 8) in accordance with an embodiment of the present invention.
Figure 9:
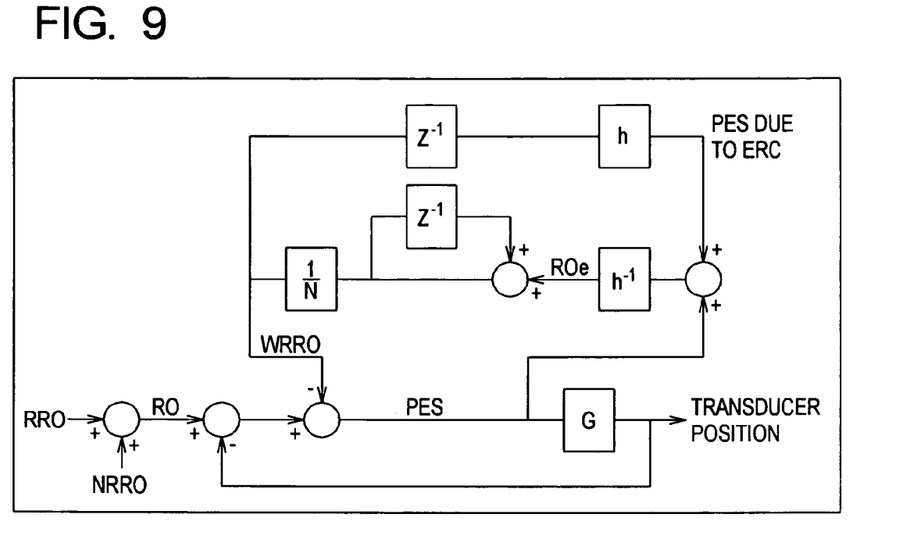

FIG. 8 is a flowchart that illustrates a method for determining ERC values using feedback in accordance with one embodiment of the present invention.

When determining the ERC values, certain initial conditions must be set for the first revolution of the disk 108, as set forth in step 805. More specifically, N (which represents the revolution of the disk 108 for which the ERC values are determined) is set to 1. Since no ERC was made in a prior revolution of the disk 108, the PES RRO due to ERC is set to zero for the prior revolution (N−1) of the disk 108 and the accumulated estimated runout (step 832 described below) is set to zero. Therefore, the PES RRO due to ERC for revolution 0 of the disk 108 is set to 0. In practice, the ERC values are initially set to zero in the disk drive 100.

Next, in step 810, the PES RRO for revolution N of the disk 108 is determined by track following and measuring the position error associated with each servo sector 212 in the track 132. Subsequently, in step 820, the PES RRO due to ERC for the prior revolution (N−1) of the disk 108 is added to the values determined in step 810 on a sector-by-sector basis, which results in a total PES RRO that has values associated with each servo sector 212 of the track 132 being corrected. For N=1, the PES RRO due to ERC is 0, as set forth in step 805.

In step 825, the inverse impulse response for the servo control system 144 is determined. U.S. Pat. No. 6,549,362 describes a method for determining the inverse impulse response for a servo control system by injecting or otherwise providing an impulse function into the servo control system and measuring the response of the servo control system. It should be understood that the present invention is not limited by the way the inverse impulse response of the servo control system is established.

A circular convolution of the total PES RRO (step 820) and the inverse impulse response of the servo control system 144 (step 825) is performed to obtain estimated runout values associated with each servo sector 212 (step 830), which are summed with all prior estimated runout values in an accumulator (step 832). Then, in step 835, the accumulated estimated runout values are divided by N, which results in the WRRO for revolution N of the disk 108. ERC values are determined for the track 132 based upon the WRRO for revolution N of the disk 108 and are electronically updated (step 840).

In step 845, the value of N is incremented by one in preparation for obtaining ERC values for a next revolution of the disk 108. In step 848, the impulse response of the servo control system 144 is determined. U.S. Pat. No. 6,549,362 describes a technique for obtaining the impulse response of a servo control system. Then, in step 850, the PES RRO due to the ERC values from the prior revolution (N−1) of the disk 108 is obtained by convolving the WRRO for the prior revolution (N−1) of the disk 108 with the impulse response of the servo control system 144.

After obtaining the ERC values from the prior revolution (N−1) of the disk 108 (step 840), and obtaining the PES RRO due to ERC from the prior revolution (N−1) of the disk 108 (step 850), measurements are taken of the PES RRO for revolution N of the disk 108, which now include updated ERC values (step 840) that are, preferably, applied electronically (step 810). Subsequently, in step 820, the PES RRO due to ERC for the prior revolution (N−1) of the disk 108, which was determined in step 850, is added to obtain a total PES RRO. The total PES RRO is convolved with the inverse impulse response for the servo control system 144 (step 830) to obtain an estimated runout, which is summed with the results for the prior revolutions of the disk 108 (step 832) and then divided by N to obtain the WRRO for revolution N of the disk 108 (step 835). The ERC values for the track 132 are calculated based on the WRRO for revolution N of the disk 108 and are electronically updated on a sector-by-sector basis (step 840). The process repeats until a decision is made that the total number of revolutions of the disk 108 for determining the ERC values with feedback has been met, or some other criteria has been satisfied (e.g., runout measurement, time spent on a track in question, etc.). Then, the ERC values are written to the disk drive 100 (e.g., in the servo sectors 212, in a look-up table, in memory, etc.). The feedback provided by the present invention forces errors (e.g., PES non-linearities, gain errors modeling the inverse impulse response (or plant), and errors introduced into the servo control system 144 by NRRO) to be driven to a null.

Certain other advantages may be obtained by the present invention, since it can handle gain errors associated with modeling the impulse response. For a number of reasons, including differences in skew angle, the impulse response is not the same for all tracks on a disk surface. In fact, gain variations of 5–10% may exist from the inner diameter to the outer diameter of a disk surface. Accordingly, in order to more accurately determine the WRRO for a particular track in an open-loop system, the impulse response should be measured on a track-by-track basis. However, due to the number of tracks, this becomes extremely time-consuming. Therefore, the impulse response is determined for one track of a disk surface, which presents errors in an open-loop system.

Because the closed-loop system of the present invention drives the gain errors to zero, it is more forgiving in modeling the impulse response. Accordingly, even though the impulse response is determined for one track on a disk surface, it can be used reliably with the present invention. Therefore, errors are reduced as compared to an open-loop system.

While the description in connection with FIG. 8 shows the ERC values being updated on a revolution-by-revolution basis, the ERC values may be updated on a sector-by-sector basis. For example, for every servo sector 212, a single PES RRO due to ERC for the prior revolution (N−1) of the disk 108 may be calculated and stored electronically for subsequent use. Similarly, for every servo sector 212, a single estimated runout value may be calculated.

Another advantage of the present invention is that ERC values can continue to be obtained after the disk drive 100 has left the factory (e.g., is in the possession of an end user). In such case, the present invention would run in the background of normal operation for the disk drive 100.

As mentioned in the background of the invention section, due to time constraints, only the most poorly-written tracks are corrected in the manufacturing process. For even those tracks that are being corrected during the manufacturing process, only a small amount of time can be spent, which leaves room for improvement of the ERC values for the tracks.

Since the present invention can be used after manufacturing the disk drive 100, the present invention can provide the ERC values for all of the tracks 132 (which is preferred) as opposed to providing the ERC values for only some of the tracks 132. The present invention may also be used to improve the ERC values for the tracks 132. Furthermore, since the disk drive 100 parameters (e.g., flying height, head linearity, magnetic image, burst sizes, etc.) change over time, the present invention may be used to update the ERC values for all the tracks 132 (i.e., some tracks 132 can be re-done) after a period of time (e.g., a year).

In performing ERC outside of the factory, the flowchart of FIG. 8 must be slightly modified. Specifically, the current ERC values for each servo sector 212 of a track 132 must be read or pre-loaded in step 805 if the ERC values have been previously determined for the track 132. If ERC values have not been previously determined for a track 132, then the ERC values are set to 0 as before.

Furthermore, the value of N must be set in step 805. If the prior ERC values have been calculated, N could be counted and stored in the disk drive 100 to reflect the actual number of revolutions of the disk 108 used in developing the ERC values. Instead, N may not bear any relation to the actual revolutions of the disk 108 used in developing the prior ERC values. That is, the value of N will determine how quickly the system will converge and, therefore, may be selected in accordance with design considerations. If N is too high, the system will not converge for a long period of time. However, if N is too small, the system will be very sensitive to NRRO for the first few revolutions of the disk 108 and, therefore, the RRO may temporarily increase until the NRRO can be cancelled. In one embodiment, N is 10, which is equivalent to starting the process up again after 10 revolutions of the disk 108 of error correction with feedback. It is also necessary to preload the accumulator (step 832) with values equal to N times the ERC values read from the disk drive 100.

In another embodiment of the present invention, the disk drive 100 could keep track of the tracks 132 that have been corrected by setting a flag in each servo sector 212 or by storing such information at an appropriate location on the disk surface 204 (or in the disk drive 100). In such an embodiment, a track 132 can be considered corrected if ERC updating was performed for a predetermined number of revolutions (e.g., 50 revolutions) of the disk 108. The disk drive 100 can skip tracks 132 (or servo sectors 212 in tracks 132) that have their flag set and correct tracks 132 that don't have their flag set.

In yet another embodiment, the ERC values could be obtained by moving from the outer diameter of the disk 108 to the inner diameter of the disk 108 (or visa versa). The location of the last corrected track 132 may be stored so that the process can be continued if it was interrupted.

Correcting tracks 132 in the field may pose additional problems in that, if the ERC values are changed after data has been written, it can become difficult (if not impossible) to recover the data. Therefore, in one embodiment, data from the track 132 being corrected may be stored in a buffer while the track 132 is corrected. After the ERC values are obtained for the track 132, the data is written back to the track 132, preferably while the final ERC values are written to the track 132.

The present invention may be implemented in the firmware of the controller 136 and/or the channel 140 or any other convenient place in the disk drive 100. In addition, the present invention may be implemented in a computer external to the disk drive 100.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:

determining a first ERC value using the transducer to read a servo sector during a first revolution of the disk;

determining a second ERC value using the first ERC value and the transducer to read the servo sector during a second revolution of the disk;

determining an updated ERC value for the servo sector using the first and second ERC values;

writing the updated ERC value to the servo sector;

generating a third PES using the transducer to read the updated ERC value and servo bursts in the servo sector during a third revolution of the disk; and using the third PES to position the transducer as the transducer writes user data to a data field that is adjacent to the servo sector during the third revolution of the disk.

2. The method of claim 1, wherein determining the first ERC value includes applying a first PES to an inverse transfer function of the servo control system, and determining the second ERC value includes applying a second PES to the inverse transfer function of the servo control system.

3. The method of claim 2, wherein determining the second PES includes using the transducer to read the servo sector during the second revolution of the disk.

4. The method of claim 3, wherein determining the second PES includes calculating a calculated PES.

5. The method of claim 4, wherein determining the calculated PES includes using the first ERC value.

6. The method of claim 5, wherein determining the calculated PES includes applying the first ERC value to a transfer function of the servo control system.

7. The method of claim 1, wherein determining the updated ERC value includes averaging the first and second ERC values.

8. The method of claim 1, wherein the first and second revolutions of the disk are consecutive revolutions of the disk.

9. The method of claim 1, including determining the first, second and updated ERC values after manufacture of the disk drive, thereby providing an initial ERC value for the servo sector after manufacture of the disk drive.

10. The method of claim 1, including determining the first, second and updated ERC values after manufacture of the disk drive, thereby updating a prior ERC value for the servo sector after manufacture of the disk drive.

11. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:

generating a first PES using the transducer to read a servo sector during a first revolution of the disk;

determining a first ERC value for the servo sector using the first PES;

generating a second PES using the first ERC value and the transducer to read the servo sector during a second revolution of the disk;

determining a second ERC value for the servo sector using the second PES;

determining an updated ERC value for the servo sector using the first and second ERC values;

writing the updated ERC value to the servo sector;

generating a third PES using the transducer to read the updated ERC value and servo bursts in the servo sector during a third revolution of the disk; and using the third PES to position the transducer as the transducer writes user data to a data field that is adjacent to the servo sector during the third revolution of the disk.

12. The method of claim 11, wherein determining the first ERC value includes using another ERC value for the servo sector.

13. The method of claim 11, wherein determining the first ERC value excludes using another ERC value for the servo sector.

14. The method of claim 11, wherein determining the first ERC value includes applying the first PES to an inverse transfer function of the servo control system, and determining the second ERC value includes applying the second PES to the inverse transfer function of the servo control system.

15. The method of claim 11, wherein determining the first ERC value includes convolving the first PES with an inverse impulse response of the servo control system, and determining the second ERC value includes convolving the second PES with the inverse impulse response of the servo control system.

16. The method of claim 11, wherein determining the updated ERC value includes averaging the first and second ERC values.

17. The method of claim 11, wherein determining the updated ERC value includes determining N ERC values that include the first and second ERC values using the transducer to read the servo sector during N revolutions of the disk, and dividing a sum of the N ERC values by N.

18. The method of claim 17, wherein N is predetermined.

19. The method of claim 11, wherein the first and second revolutions of the disk are consecutive revolutions of the disk.

20. The method of claim 11, including:

generating a prior PES using the transducer to read the servo sector during a prior revolution of the disk;

determining a prior ERC value for the servo sector using the prior PES;

generating the first PES using the prior ERC value and the transducer to read the servo sector during the first revolution of the disk; and determining the updated ERC value using the prior, first and second ERC values.

21. The method of claim 11, including:

generating a later PES using the first and second ERC values and the transducer to read the servo sector during a later revolution of the disk between the second and third revolutions of the disk;

determining a third ERC value for the servo sector using the later PES; and determining the updated ERC value using the first, second and third ERC values.

22. The method of claim 11, including:

calculating a calculated PES using the first ERC value; and determining the second PES using the calculated PES, the first ERC value and the transducer to read the servo sector during the second revolution of the disk.

23. The method of claim 22, wherein calculating the calculated PES includes applying the first ERC value to a transfer function of the servo control system.

24. The method of claim 11, including performing the method on a sector-by-sector basis for each servo sector in a track that includes the servo sector.

25. The method of claim 11, including performing the method a first time on selected tracks during manufacture of the disk drive, and performing the method a second time on the selected tracks after manufacture of the disk drive.

26. The method of claim 11, including performing the method a first time on first selected tracks during manufacture of the disk drive, and performing the method a first time on second selected tracks after manufacture of the disk drive.

27. The method of claim 11, including performing the method a first time on first selected tracks during manufacture of the disk drive, performing the method a first time on second selected tracks after manufacture of the disk drive, and performing the method a second time on the first selected tracks after manufacture of the disk drive.

28. The method of claim 11, including determining the first and second ERC values during manufacture of the disk drive, and determining the updated ERC value after manufacture of the disk drive.

29. The method of claim 11, including determining the first, second and updated ERC values after manufacture of the disk drive, thereby providing an initial ERC value for the servo sector after manufacture of the disk drive.

30. The method of claim 11, including determining the first, second and updated ERC values after manufacture of the disk drive, thereby updating a prior ERC value for the servo sector after manufacture of the disk drive.

31. A method of determining embedded runout correction (ERC) values in a disk drive, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:
generating a first PES using the transducer to read a servo sector during a first revolution of the disk;
determining a first ERC value for the servo sector by applying the first PES to an inverse transfer function of the servo control system;
calculating a calculated PES by applying the first ERC value to a transfer function of the servo control system;
generating a second PES using the calculated PES, the first ERC value and the transducer to read the servo sector during a second revolution of the disk;
determining a second ERC value for the servo sector by applying the second PES to the inverse transfer function of the servo control system;
determining an updated ERC value for the servo sector using the first and second ERC values;
writing the updated ERC value to the servo sector;
generating a third PES using the transducer to read the updated ERC value and servo bursts in the servo sector during a third revolution of the disk; and
using the third PES to position the transducer as the transducer writes user data to a data field that is adjacent to the servo sector during the third revolution of the disk.

32. The method of claim 31, wherein determining the first ERC value includes convolving the first PES with an inverse impulse response of the servo control system, determining the second ERC value includes convolving the second PES with the inverse impulse response of the servo control system, and calculating the calculated PES includes convolving the first ERC value with an impulse response of the servo control system.

33. The method of claim 31, wherein determining the updated ERC value includes averaging the first and second ERC values.

34. The method of claim 31, wherein determining the updated ERC value includes determining N ERC values that include the first and second ERC values using the transducer to read the servo sector during N revolutions of the disk, and dividing a sum of the N ERC values by N.

35. The method of claim 34, wherein N is predetermined.

36. The method of claim 31, wherein the first and second revolutions of the disk are consecutive revolutions of the disk.

37. The method of claim 31, including:
calculating a second calculated PES by applying the second ERC value to the transfer function of the servo control system;
generating a later PES using the second calculated PES, the first and second ERC values and the transducer to read the servo sector during a later revolution of the disk between the second and third revolutions of the disk;
determining a third ERC value for the servo sector by applying the later PES to the inverse transfer function of the servo control system; and
determining the updated ERC value using the first, second and third ERC values.

38. The method of claim 31, including performing the method on a sector-by-sector basis for each servo sector in a track that includes the servo sector.

39. The method of claim 31, including determining the firsts second and updated ERC values after manufacture of the disk drive, thereby providing an initial ERC value for the servo sector after manufacture of the disk drive.

40. The method of claim 31, including determining the first, second and updated ERC values after manufacture of the disk drive, thereby updating a prior ERC value for the servo sector after manufacture of the disk drive.

41. A method of determining embedded runout correction (ERC) values in a disk drive after the disk drive has been manufactured and is in the possession of an end user and is operably connected to a host computer, wherein the disk drive includes a transducer, a disk and a servo control system, the transducer reads data from and writes data to the disk, the disk includes tracks, the tracks each include servo sectors, the ERC values provide compensation for repeatable runout (RRO) in the tracks, and a position error signal (PES) positions the transducer relative to the tracks, the method comprising:
generating a first PES using the transducer to read a servo sector during a first revolution of the disk;
determining a first ERC value for the servo sector by applying the first PES to an inverse transfer function of the servo control system;
calculating a calculated PES by applying the first ERC value to a transfer function of the servo control system;
generating a second PES using the calculated PES, the first ERC value and the transducer to read the servo sector during a second revolution of the disk;
determining a second ERC value for the servo sector by applying the second PES to the inverse transfer function of the servo control system;
determining an updated ERC value for the servo sector using the first and second ERC values;
writing the updated ERC value to the servo sector;
generating a third PES using the transducer to read the updated ERC value and servo bursts in the servo sector during a third revolution of the disk; and
using the third PES to position the transducer as the transducer writes user data to a data field that is adjacent to the servo sector during the third revolution of the disk.

42. The method of claim 41, wherein determining the first ERC value includes convolving the first PES with an inverse impulse response of the servo control system, determining the second ERC value includes convolving the second PES with the inverse impulse response of the servo control system, and calculating the calculated PES includes convolving the first ERC value with an impulse response of the servo control system.

43. The method of claim 41, wherein determining the updated ERC value includes averaging the first and second ERC values.

44. The method of claim 41, wherein determining the updated ERC value includes determining N ERC values that include the first and second ERC values using the transducer to read the servo sector during N revolutions of the disk, and dividing a sum of the N ERC values by N.

45. The method of claim 44, wherein N is predetermined.

46. The method of claim 41, wherein the first and second revolutions of the disk are consecutive revolutions of the disk.

47. The method of claim 41, including:
    calculating a second calculated PES by applying the second ERC value to the transfer function of the servo control system;
    generating a later PES using the second calculated PES, the first and second ERC values and the transducer to read the servo sector during a later revolution of the disk between the second and third revolutions of the disk;
    determining a third ERC value for the servo sector by applying the later PES to the inverse transfer function of the servo control system; and
    determining the updated ERC value using the first, second and third ERC values.

48. The method of claim 41, including performing the method on a sector-by-sector basis for each servo sector in a track that includes the servo sector.

49. The method of claim 41, including performing the method on a track-by-track basis for each track that contains data fields for storing user data.

50. The method of claim 41, including performing the method on a sector-by-sector basis for each servo sector in each track that contains data fields for storing user data.

51. The method of claim 41, including performing the method only on the most poorly written tracks during manufacture of the disk drive, and performing the method on other tracks after manufacture of the disk drive.

52. The method of claim 41, including performing the method only on the most poorly written tracks during manufacture of the disk drive, and performing the method on each of the tracks after manufacture of the disk drive.

53. The method of claim 41, including periodically performing the method after manufacture of the disk drive.

54. The method of claim 41, including periodically performing the method on each of the tracks after manufacture of the disk drive.

55. The method of claim 41, including performing the method as a background function during normal operation of the disk drive.

56. The method of claim 41, including storing a location of a track that includes the servo sector, discontinuing the method due to an interruption, and repeating the method on another track in response to the stored location.

57. The method of claim 41, including writing the updated ERC value to the servo sector and the user data to the data field during a single revolution of the disk.

58. The method of claim 41, including:
    reading the user data from the data field;
    storing the user data in a buffer; and then
    writing the updated ERC value to the servo sector and the user data to the data field during a single revolution of the disk.

59. The method of claim 41, including reading a flag that indicates an ERC value does not exist for the servo sector, thereby providing the updated ERC value as an initial ERC value for the servo sector.

60. The method of claim 59, including setting the flag to indicate that the updated ERC value exists for the servo sector.

* * * * *